Feb. 28, 1928.

H. J. FANGER

SOLDERING IRON

Filed Aug. 23, 1926

INVENTOR.
Herman J. Fanger
BY
Townsend, Loftus & Abbett
ATTORNEYS

Patented Feb. 28, 1928.

1,660,920

UNITED STATES PATENT OFFICE.

HERMAN J. FANGER, OF OAKLAND, CALIFORNIA, ASSIGNOR TO WALDEMAR H. GUNDERSEN, OF OAKLAND, CALIFORNIA.

SOLDERING IRON.

Application filed August 23, 1926. Serial No. 130,924.

This invention relates to soldering irons employing electrical current as a heating medium.

It is the principal object of the present invention to generally improve and simplify soldering irons of the character referred to whereby to provide an efficient soldering iron which will operate with electrical current of low voltage and which is comparatively inexpensive to manufacture.

The present invention contemplates the provision of a soldering iron having a heating element formed of comparatively heavy wire of few turns which is mounted in the tip in a manner insuring that maximum efficiency will be obtained. The tip carrying the heating element is connected to a handle by means of a tubular shank in a manner which renders the device inexpensive to construct and assemble.

One form which the invention may assume is exemplified in the following description and illustrated by way of example in the accompanying drawings, in which.

Figure 1:
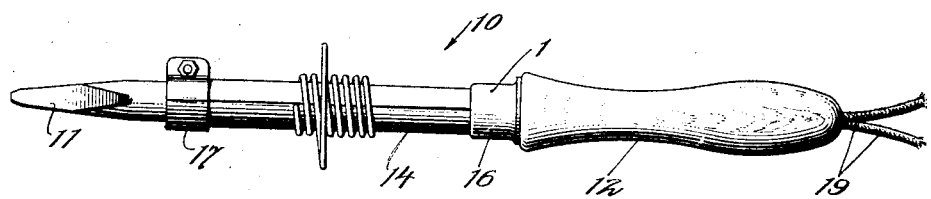
Fig. 1 is a side elevation of a soldering iron embodying the preferred form of my invention.

Referring more particularly to the accompanying drawings, 10 indicates a soldering iron employing low voltage current as a heating medium. This iron comprises a copper tip 11 and a handle 12 which are spaced apart and rigidly connected by means of a tubular shank 14. This tubular shank 14 is divided longitudinally in halves and its inside diameter substantially agrees with the diameter of the tip 11 and a reduced portion 15 on the handle 12. The diameter of the reduced portion 15 on the handle is slightly larger than that of the tip so that the tubular shank 14 when arranged between the tip 11 and the handle will taper slightly from the tip to the handle.

For the purpose of clamping the shank 14 to the tip 11 and to the handle, a pair of collars 16 and 17 are provided. In assembling the iron the collar 16 is first slipped over the tip and along the shank and then driven into place to clamp one end of the shank to the reduced portion 15 of the handle. As the shank slightly tapers, a tight fit may be obtained between the collar 16 and that portion of the shank which embraces the reduced portion 15 on the handle. As the shank is formed in two parts, a clamping effect will be obtained to rigidly unite the end of the shank and the handle.

After the collar 16 is in place the collar 17 is arranged over the tip and the adjacent end of the shank is contracted to clamp the shank to the tip.

Figure 2:
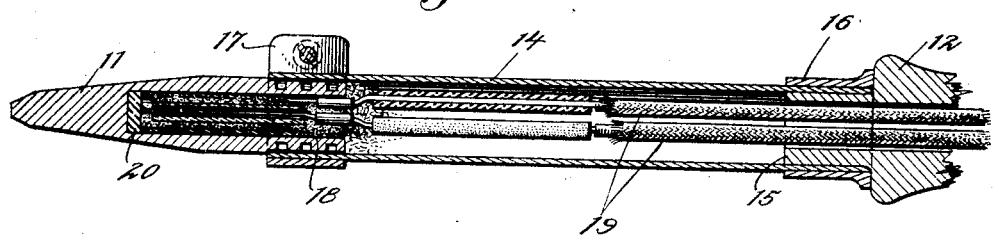
Fig. 2 is an enlarged sectional view through the tip of the iron.
Figure 3:
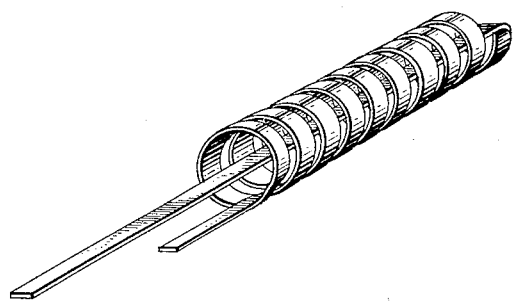
Fig. 3 is a perspective view of the heating element.

Reference being had to Fig. 2 of the drawings it is seen that at its inner end the tip 11 is formed with an inwardly extending bore 18 of sufficient depth to accommodate a heating element, which is constructed of comparatively heavy flat wire which is formed into a coil of a diameter sufficient to cause it to intimately engage the sides of the bore.

In actual practice I coat either the exterior surfaces of the element or the surface of the bore with a cerium dioxide composition, which forms a thin insulating coating sufficient to insulate the element from the copper tip.

In placing the element within the bore of the tip, it is tightly wound on a mandrel of less diameter than the bore of the tip. From this mandrel it is inserted into the bore of the tip and released so that it will expand and firmly bear against the sides of the bore. After the element is in place refractory cement is placed in the bore to completely fill the spaces between the convolutions of the element and to secure the same to the copper tip.

It will be noticed that one of the ends of the element is turned back and projects axially through the element toward the handle. The other end of the element is turned rearwardly at the perimeter of the element. A piece of porcelain tubing is placed over the centrally located element end to prevent contact between the two ends of the element. These ends of the element are then connected to wires 19 which are led through the tubular shank 14 and the handle 12, the latter being centrally bored for this purpose.

In assembling the iron for use, the parts are constructed as shown in the drawings, and either the exterior surface of the element or the sides of the bore in the tip is coated with a cerium dioxide composition forming a thin insulating layer for insulating the element from the tip. An insulating button 20 is then placed at the inner end of the bore. The element is then wound tightly on the mandrel which is smaller in diameter than the bore in the tip, and in this condition it is inserted within the bore of the tip. When the mandrel is removed and the element released, the latter will expand and engage the sides of the bore. An amount of refractory cement is then introduced into the bore, after which the porcelain tube is arranged over the central terminal of the element and forced inwardly within the bore in the tip. This causes the charge of refractory cement in the bore to find its way between the convolutions of the element, sealing the element from the air which insures longer life for the element.

After this has been accomplished the terminals of the element will project outwardly from the tip at spaced distances apart. These terminals are then connected to the ends of the wires by soldering or crimping, as desired. The end of the wire is stripped of its insulation for a short distance and the porcelain tubes are arranged thereon. The wires are led through the handle and fitted with a plug or connectors.

The halves of the tubular shank are then arranged over the reduced portion of the handle and the inner end of the tip and the collars 16 and 17 are applied to clamp the shank to the handle and to the tip. The iron is then ready for use.

It will be noticed from Fig. 2 that a plurality of annular grooves are formed about the end of the tip 11 at the point where it is engaged by the tubular shank. These annular grooves reduce the cross-sectional area of the tip at this point and materially reduces the heat transmission from the tip to the shank, and consequently increases the efficiency of the iron.

It is desired to point out that in high voltage irons the insulation between the element and the tip must be very thick to keep from breaking down. This thick insulation detracts considerably from the efficiency of the iron and it is also a very good heat insulator. In the present instance by using low voltage a very thin coating of insulation may be employed between the element and the tip and consequently the iron is more efficient.

It will also be noticed that the wire which forms the heating element in the present instance is comparatively heavy and short and is not liable to break or burn out, which are the disadvantages of high voltage irons wherein the element is formed of many turns of very fine wire, which easily breaks and burns out.

The present iron is adapted to be operated on six volt current so that it may be used in connection with ordinary radio A batteries or with an automobile battery. Thus the iron may be carried as equipment in an automobile for making electrical repairs at any time. When used for radio work, it may be used to repair a set and may be operated directly from the radio A battery.

From the foregoing it is obvious that I have provided an iron which is of very simple and inexpensive construction and very efficient.

While I have shown the preferred form of my invention, it is to be understood that various changes may be made in its construction by those skilled in the art, without departing from the spirit of the invention as defined in the appended claims.

Having thus described my invention, what I claim and desire to secure by Letters Patent is:

1. A method of mounting a heating element in a member to be heated which comprises forming a bore in the member to be heated, coiling a heating element of flat wire on a mandrel smaller in diameter than the bore with the flat surface of the wire disposed parallel to the axis of the coil, forming an extremely thin coating of insulation on the sides of the bore, inserting the coiled element into the bore while still on the mandrel, and then removing the mandrel to permit the element to expand and engage the sides of the bore, and then filling the spaces between the convolutions of the element with a refractory cement.

2. A soldering iron tip having a bore formed inwardly from one end thereof, an insulating button at the inner end of said bore, a heating coil of comparatively heavy wire wound convolutely, one end of said coil extending coaxially through the coil and parallel to the other end of the coil, said coil being inserted in said bore against said button and having an inherent tendency to expand whereby its convolutions will be pressed tightly against the sides of the bore, and a thin layer of insulation interposed between the coil and the sides of the bore.

3. A soldering iron tip having a bore formed inwardly from one end thereof, an insulating button at the inner end of said bore, a heating coil of comparatively heavy wire wound convolutely, one end of said coil extending coaxially through the coil and parallel to the other end of the coil, said coil being inserted in said bore against said button and having an inherent tendency to expand whereby its convolutions will be pressed tightly against the sides of the bore, a thin layer of insulation interposed between the coil and the sides of the bore, the spaces between said convolutions and the interior of the bore about the coil being filled with refractory cement after the insertion or positioning of the coil in the bore.

4. In a device of the character described a soldering iron tip having a bore extending inwardly from one end thereof, said bore having parallel sides and a button of insulating material of the same diameter as the bore and positioned at the inner end of the bore, a heating coil of comparatively heavy flat wire inserted within the bore, one end of said coil being returned through the center of the coil to project outwardly from the end of the bore in parallelism and spaced relation from the other end of the coil, a thin layer of insulation interposed between the coil and the sides of the bore, said coil having an inherent tendency to expand whereby its convolutions will be pressed tightly against the insulation of the sides of the bore, a tube of insulation arranged over said centrally extending end of the coil, a refractory cement inserted in the bore after the positioning of the coil to completely fill the spaces in the bore and maintain the heating coil in place.

HERMAN J. FANGER.